United States Patent
Makino et al.

(10) Patent No.: US 7,409,139 B2
(45) Date of Patent: Aug. 5, 2008

(54) HALOGENATED POLYAMIDE ACID COMPOSITION AND ITS APPLICATIONS

(75) Inventors: Tomomi Makino, Ashiya (JP); Kozo Tajiri, Sanda (JP); Shinichi Goto, Kakogawa (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 11/505,844

(22) Filed: Aug. 18, 2006

(65) Prior Publication Data

US 2007/0041700 A1 Feb. 22, 2007

(30) Foreign Application Priority Data

Aug. 22, 2005 (JP) ............... 2005-240334
Dec. 27, 2005 (JP) ............... 2005-375908

(51) Int. Cl.
*G02B 6/00* (2006.01)
(52) U.S. Cl. ....................... 385/143; 385/145
(58) Field of Classification Search ............ None
See application file for complete search history.

(56) References Cited

U.S. PATENT DOCUMENTS

| | | | | |
|---|---|---|---|---|
| 5,108,201 A | * | 4/1992 | Matsuura et al. | 385/143 |
| 5,122,563 A | | 6/1992 | Kaminski et al. | |
| 5,233,018 A | * | 8/1993 | Ando et al. | 528/353 |
| 5,649,045 A | * | 7/1997 | Fjare et al. | 385/145 |
| 5,922,440 A | | 7/1999 | Schlueter, Jr. et al. | |
| 6,486,292 B2 | * | 11/2002 | You et al. | 528/170 |
| 2004/0197064 A1 | * | 10/2004 | Kawamonzen et al. | 385/129 |

FOREIGN PATENT DOCUMENTS

| | | |
|---|---|---|
| JP | 3-72528 | 3/1991 |
| JP | 4-8734 | 1/1992 |
| JP | 4-189868 | 7/1992 |
| JP | 4-328504 | 11/1992 |

(Continued)

OTHER PUBLICATIONS

Machine translation of detailed description of JP 8-73739 A, retrieved from http://www4.ipdl.inpit.go.jp/Tokujitu/tjsogodben.ipdl?N0000=115 on Sep. 9, 2007.*

(Continued)

*Primary Examiner*—Sung Pak
*Assistant Examiner*—Mike Stahl
(74) *Attorney, Agent, or Firm*—Wenderoth, Lind & Ponack, LLP

(57) ABSTRACT

A halogenated polyamide acid composition containing a halogenated polyamide acid, a metal oxide precursor, a catalyst of reaction of generating a metal oxide from the precursor, and/or a coupling agent having a reactive group. A halogenated polyimide film is obtained by, for example, carrying out the heat treatment of the halogenated polyamide acid composition. The halogenated polyimide film has a refractive index at wavelength of, for example, 1,550 nm of 1.520 or lower. Further, an optical waveguide uses the halogenated polyimide film as at least one of a core layer and a clad layer, and a relative refractive index difference between the core layer and the clad layer of the optical waveguide is, for example, 0.6 or greater. An optical waveguide device contains such an optical waveguide.

13 Claims, 1 Drawing Sheet

FOREIGN PATENT DOCUMENTS

| | | |
|---|---|---|
| JP | 6-51146 | 2/1994 |
| JP | 8-73739 | 3/1996 |
| JP | 2816771 | 8/1998 |
| JP | 11-192420 A * | 7/1999 |
| JP | 3486325 | 10/2003 |
| JP | 2004-85937 | 3/2004 |
| JP | 2004-131684 | 4/2004 |
| JP | 2005-37841 | 2/2005 |
| JP | 2005-350562 | 12/2005 |
| JP | 2006-83348 | 3/2006 |
| JP | 2006-312680 | 11/2006 |

OTHER PUBLICATIONS

Machine translation of detailed description of JP 3486325 B, retrieved from http://www4.ipdl.inpit.go.jp/Tokujitu/tjsogodben.ipdl?N0000=115 on Sep. 9, 2007.*

M. Oh et al. Polymeric waveguide polarization splitter with a buried birefringent polymer. IEEE Photonics Technology Letters, vol. 11 No. 9, 1144-1146, Sep. 1999.*

S. Ando. Optical properties of fluorinated polyimides and their applications to optical components and waveguide circuits. Journal of Photopolymer Science and Technology, vol. 17 No. 2, 219-232, 2004.*

A. Somwangthanaroj et al. Green-light emission of ZnO nanoparticles spontaneously precipitated in fluorinated polyimide films. Proceedings of SPIE vol. 6122, Zinc Oxide Materials and Devices, 61220E-1-61220E-8, Mar. 2006.*

T. Sawada et al. Synthesis, characterization, and optical properties of metal-containing fluorinated polyimide films. Chemistry of Materials, vol. 10 No. 11, 3368-3378, Nov. 1998.*

European Search Report issued Apr. 15, 2008 in counterpart European application No. 06016928.

XP000567641, Shinji Ando et al., "Perfluorinated polymers for optical waveguides", vol. 24, No. 12, pp. 20-27, Dec. 1994.

* cited by examiner

HALOGENATED POLYAMIDE ACID COMPOSITION AND ITS APPLICATIONS

BACKGROUND OF THE INVENTION

1. Field of the Invention

The present invention relates to a halogenated polyamide acid composition, a halogenated polyimide film obtained therefrom, an optical waveguide, and an optical waveguide device.

2. Description of the Related Art

Technologies with respect to an optical waveguide as its basic component have been marked in accordance with the practical use of an optical communication system. The optical waveguide typically has an embedded type structure in which a clad layer with a low refractive index surrounds a core layer with a high refractive index, or a ridge type structure in which a core layer with a high refractive index is formed on a lower clad layer with a low refractive index and an upper clad layer is made of an air layer, and light injected into the optical waveguide is transmitted in the core layer while being reflected on the interface between the core layer and the clad layer or on the interface between the core layer and the air layer.

As the material to form an optical waveguide, there have been known inorganic materials such as quartz glass and semiconductor. On the other hand, the research and development of producing an optical waveguide with various polymers have been carried out. Since coating and heat treatment can be carried out for polymers as organic materials under normal pressure at a film forming step contrary to the inorganic materials, there is an advantage that its apparatus and production steps can be simplified.

As the material of a polymer optical waveguide, a poly (methyl methacrylate) (PMMA) has ordinarily been used because of its high optical transparency. In addition to it, polyimides have particularly been expected because they have high glass transition temperatures (Tgs) and excellent thermal resistance and they can endure heat at soldering. However, in the case of an ordinary polyimide, since the C—H bonds of a benzene ring absorb near infrared light in a near infrared region (at a wavelength of from 1,000 to 1,700 nm) used for optical communication, the deuteration and fluorination of hydrogen atoms are necessary for securing optical transparency. For example, the Japanese Patent Application Laid-Open (JP-A) Nos. 3-72528, 4-328504, 2004-85937, and 2005-37841, and the Japanese Patent (JP-B) No. 2816771 disclose various fluorinated polyimides useful for the material of a polymer optical waveguide.

By the way, as described above, it is required to provide a relative refractive index difference between the core layer and the clad layer in the optical waveguide. Accordingly, for example, in the Japanese Patent Application Laid-Open (JP-A) Nos. 3-72528, and 4-328504, and the Japanese Patent (JP-B) No. 2816771, polyimides different in molecular chain skeleton are selected as the materials of both layers, or only the core layer is formed with a fluorinated polyimide and a material (e.g., a silicon oxide film or an air layer) other than polymers is used for the clad layer. In contrast, in the Japanese Patent Application Laid-Open (JP-A) Nos. 2004-85937 and 2005-37841, the core layer and the clad layer are formed with a fluorinated polyimide having basically the same molecular chain skeleton and a relative refractive index difference is provided by changing the fluorine contents of both layers.

Further, for example, the Japanese Patent Application Laid-Open (JP-A) No. 4-8734 discloses a method of controlling a relative refractive index difference by copolymerizing two kinds of fluorinated polyimides and adjusting the fluorine content of the resulting copolymer, and the Japanese Patent Application Laid-Open (JP-A) No. 6-51146 discloses a method of controlling a relative refractive index difference by irradiating electron beam to a fluorinated polyimide and adjusting its exposure dose.

However, these methods change the molecular chain skeleton of a fluorinated polyimide, control the fluorine content of a fluorinated polyimide, carries out the copolymerization of fluorinated polyimides, and carries out the irradiation of electron beams to a fluorinated polyimide, and therefore, they have problems that: they can be applied to only a fluorinated polyimide having a specific molecular structure; a large scale apparatus and complicated producing steps are required; and the like.

Thus, the Japanese Patent (JP-B) No. 3486325 discloses a method of obtaining partially fluorinated polyimide having a lowered refractive index by adding silica ultrafine particles to a partially fluorinated polyamide acid as a precursor, followed by heat treatment, as a method of simply controlling a relative refractive index difference using an ordinary fluorinated polyimide. Since the refractive index of quartz glass is about 1.45, it lowers a refractive index without lowering an optical transparency by dispersing silica ultrafine particles in a partially fluorinated polyimide.

However, the method of the Japanese Patent (JP-B) No. 3486325 has a problem that productivity is extremely bad because it is necessary to stir a mixture for 24 hours in order to improve dispersibility after adding a dispersed solution of silica ultrafine particles to a solution of a partially fluorinated polyamide acid.

By the way, the Japanese Patent Application Laid-Open (JP-A) No. 8-73739 discloses a production method of a polyimide composition in which silica particles are ultrafinely dispersed, characterized in that in the production method of a polyimide composition by which an alkoxysilane and/or its partially hydrolyzed condensate is reacted with a polyamide acid in the presence of water and polyimidation is subsequently carried out, the reaction is carried out in the presence of an acid catalyst and/or an amino group containing alkoxysilane. In this method, silanol is generated by the reaction of an alkoxysilane and/or its partially hydrolyzed condensate with water and a transparent polyimide composition (e.g., a polyimide film or sheet) having an excellent elastic modulus is provided by ultrafinely dispersing silica particles prepared from the silanol in the following heating step.

However, the Japanese Patent Application Laid-Open (JP-A) No. 8-73739 fails to disclose or suggest using a halogenated polyamide acid in place of a polyamide acid and is completely silent on drastically chaining a refractive index by ultrafinely dispersing silica particles while securing the appearance and transparency of the obtained halogenated polyimide film. Further, the polyimide composition disclosed in the Japanese Patent Application Laid-Open (JP-A) No. 8-73739 is described as useful for applications such as electronic materials, forming materials such as films and sheets, and coating materials, but not described as useful for optical materials.

SUMMARY OF THE INVENTION

In general, when a relative refractive index difference between the core layer and the clad layer can be increased in an optical waveguide, the bending loss of the optical waveguide is decreased; therefore, its bending radius can be decreased, and as a result, an optical circuit can possibly be downsized. Accordingly, it is desired that a relative refractive index difference between the polyimides forming the core layer and the clad layer is increased as highly as possible.

Under these circumferences, it is an object of the present invention to provide a new means capable of highly changing the refractive index of a halogenated polyimide when the halogenated polyimide is used as a material forming an optical waveguide, and its applications.

The present inventors have extensively studied, and as a result, have found that when a halogenated polyamide acid as a precursor of a halogenated polyimide is blended with a metal oxide precursor, a catalyst of reaction of generating a metal oxide from the precursor, and/or a coupling agent having a reactive group, followed by treatment such as heat treatment or drying under reduced pressure, the refractive index of the halogenated polyimide obtained can be highly changed, thereby completing the present invention.

That is, the present invention provides a halogenated polyamide acid composition comprising a halogenated polyamide acid, a metal oxide precursor, a catalyst of reaction of generating a metal oxide from the precursor, and/or a coupling agent having a reactive group.

In the halogenated polyamide acid composition of the present invention, the above halogenated polyamide acid may preferably be a partially halogenated polyamide acid obtained by reacting a fully halogenated acid dianhydride with a diamine, or may preferably be a fully halogenated polyamide acid obtained by reacting a fully halogenated acid dianhydride with a fully halogenated diamine. Further, the above coupling agent may preferably be a silane coupling agent.

The present invention further provides a halogenated polyimide film which can be obtained from the above halogenated polyamide acid composition, and a halogenated polyimide film having a refractive index at wavelength of 1,550 nm of 1.520 or lower.

The present invention further provides an optical waveguide comprising a halogenated polyimide film used for at least one of a core layer and a clad layer, a relative refractive index difference between the core layer and the clad layer of the optical waveguide being 0.6% or higher, and further provides an optical waveguide device comprising such an optical waveguide.

Since the halogenated polyamide acid composition of the present invention provides a halogenated polyimide highly changing a refractive index by only carrying out treatment such as heat treatment or drying under reduced pressure, the refractive index of a halogenated polyimide can simply be controlled when such a composition is used. The halogenated polyimide can widely be utilized in fields related to optics, for example, as optical materials such as optical films and the core layers and the clad layers of optical waveguides, making the most use of its property that the refractive index can be controlled. Further, when the catalyst of reaction of generating a metal oxide from a metal oxide precursor is added to the composition, the surface glossiness of a halogenated polyimide film obtained by treatment such as heat treatment or drying under reduced pressure is improved, and/or when a coupling agent having a reactive group is blended, the transparency and surface flatness of a halogenated polyimide film obtained by treatment such as heat treatment or drying under reduced pressure is improved.

DETAILED DESCRIPTION OF THE INVENTION

<<Halogenated Polyamide Acid Composition>>

Figure 1:
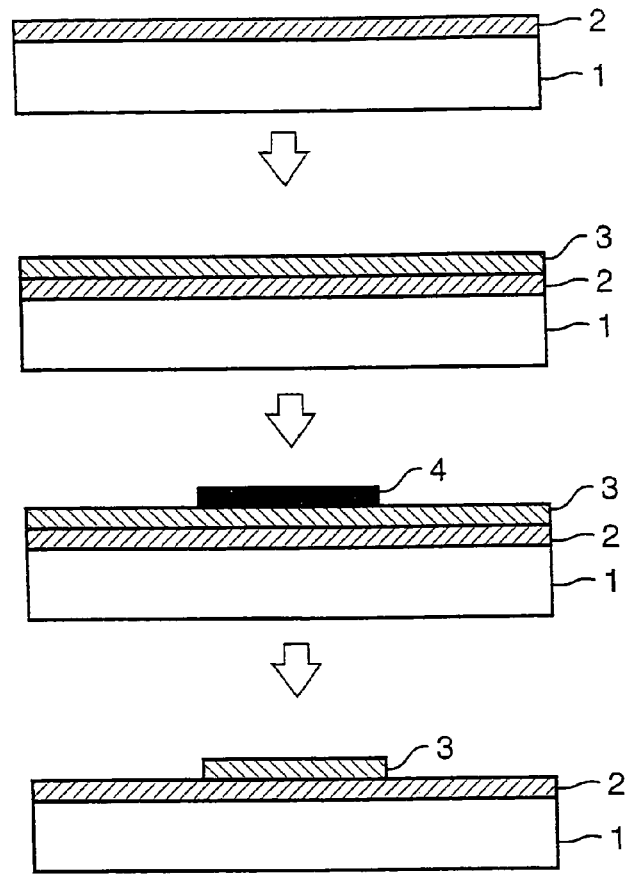
FIG. 1 is a process flow diagram for explanation of one example of the production method of a ridge type optical waveguide in the optical waveguides of the present invention.

The halogenated polyamide acid composition of the present invention (hereinafter referred to simply as "the composition of the present invention" in some cases) is characterized in it comprises a halogenated polyamide acid, a metal oxide precursor, a catalyst of reaction of generating metal oxide from the precursor (hereinafter referred to simply as "the catalyst" in some cases), and/or a coupling agent having a reactive group (hereinafter referred to simply as "the coupling agent" in some cases). The term "metal oxide precursor" as used herein means a substance which causes reaction itself to generate a metal oxide at a treatment step, such as heat treatment or drying under reduced pressure, for generating a halogenated polyimide by carrying out the treatment, such as heat treatment or drying under reduced pressure, of a halogenated polyamide acid. The term "catalyst" as used herein means a substance which serves to promote the reaction of generating a metal oxide from a metal oxide precursor. The term "coupling agent" as used herein means a substance which has a functional group reacting with a halogenated polyamide acid and which reacts with a metal oxide intermediate generated from a metal oxide precursor and which serves to bond a metal oxide to a halogenated polyimide generated after treatment such as heat treatment or drying under reduced pressure.

When the composition of the present invention is subjected to treatment such as heat treatment or drying under reduced pressure, preferably heat treatment, a halogenated polyimide is generated from a halogenated polyamide acid, and a metal oxide is generated from a metal oxide precursor. Accordingly, the refractive index of the halogenated polyimide obtained is decreased or increased by the presence of the metal oxide in comparison with the refractive index of the same halogenated polyimide not containing the metal oxide, depending on the kind of the metal oxide. Further, the metal oxide existing in the halogenated polyimide is generated from the metal oxide precursor in the composition, so that it is ultrafinely dispersed at a nano-order level and therefore does not decrease the optical transmittance of the halogenated polyimide obtained.

In the compositions of the present invention, the halogenated polyamide acid composition comprising a halogenated polyamide acid, a metal oxide precursor, and a catalyst of reaction of generating a metal oxide from the precursor provides a halogenated polyimide film having a relative refractive index difference of at least 0.6% or greater. The appearance and surface flatness of the halogenated polyimide film obtained is improved by action of the catalyst until the relative refractive index difference is about 1.6%. The term "relative refractive index difference" means a relative refractive index difference from the halogenated polyimide film obtained from the halogenated polyamide acid composition not containing the metal oxide precursor and the like.

However, it has been found that when the blending amount of the metal oxide precursor is increased for attaining a greater relative refractive index difference, the halogenated polyimide and the metal oxide cause phase separation after treatment such as heat treatment or drying under reduced pressure, and the appearance, transparency, and surface flatness of the halogenated polyimide film are decreased. In this case, even if the catalyst is added, there has been observed no effect of improving the appearance, transparency, and surface flatness of the halogenated polyimide film.

Further, in the compositions of the present invention, the halogenated polyamide acid composition comprising a halogenated polyamide acid, a metal oxide precursor, and a coupling agent having a reactive group provides a halogenated polyimide film having a relative refractive index difference of at least 0.6% or greater. Further, even if the blending amount of the metal oxide precursor is increased for attaining a relative refractive index difference from greater than 1.6% to about 3.0%, the halogenated polyimide and the metal oxide cause no phase separation after treatment such as heat treatment or drying under reduced pressure, and the appearance, transparency, and surface flatness of the halogenated polyimide film obtained is improved by the action of the coupling agent having a reactive group.

The halogenated polyamide acid, metal oxide precursor, catalyst, coupling agent, and the like to be blended in the composition of the present invention will be particularly described below.

<Halogenated Polyamide Acid>

The composition of the present invention comprises a halogenated polyamide acid as a precursor generating a halogenated polyimide by treatment such as heat treatment or drying under reduced pressure.

The blending amount of the halogenated polyamide acid may preferably be 3% to 60% by mass, more preferably 5% to 55% by mass, and still more preferably 10% to 50% by mass, relative to the total amount of the composition. When the blending amount of the halogenated polyamide acid is smaller than 3% by mass, no sufficient halogenated polyimide may be generated, even if treatment such as heat treatment or drying under reduced pressure is carried out. In contrast, when the blending amount of the halogenated polyamide acid is greater than 60% by mass, the refractive index of a halogenated polyamide acid obtained cannot sufficiently be controlled and no halogenated polyamide acid composition can be prepared because of an increase in the viscosity of the resulting composition.

The halogenated polyamide acid blended in the composition of the present invention is specifically a halogenated polyamide acid having a repeating unit of formula (1):

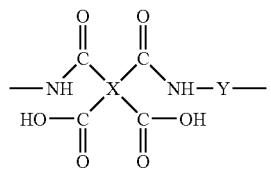
(1)

wherein X is a tetravalent organic group, Y is a divalent organic group, and X and/or Y are a group having at least one fluorine atom.

In the above formula (1), the tetravalent organic group represented by X may include tetravalent halogen-containing aliphatic organic groups derived from cyclic alkyls, chain alkyls, olefins, glycols, and the like; and tetravalent halogen-containing aromatic organic groups derived from benzene, biphenyl, biphenyl ether, bisphenylbenzene, bisphenoxybenzene, and the like. These tetravalent organic groups have to be those which have no C—H bonds and in which all of the hydrogen atoms in the C—H bonds are substituted with halogen atoms (any of a fluorine atom, a chlorine atom, a bromine atom, and an iodine atom). Considering heat resistance, chemical resistance, water repellency, and low dielectric property, it may be preferable that C—H bonds do not exist in a multilayer film of fluorinated polyimide; therefore, those which contain no C—H bonds are used as the precursor of a fluorinated polyimide in the present invention. The kind of halogen atoms may be the same or different in the tetravalent organic groups. In these tetravalent organic groups, tetravalent halogen-containing aromatic organic groups may be preferable, tetravalent fully fluorinated aromatic organic groups may be more preferable, examples of which may include tetravalent groups of the formulas:

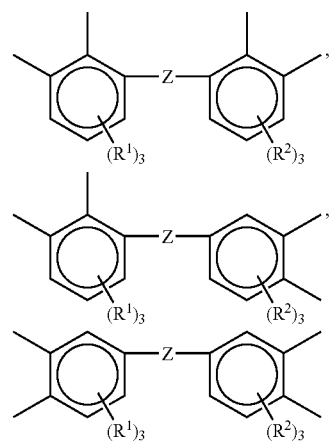

In the above three kinds of formulas, $R^1$'s and $R^2$'s each means a halogen atom, i.e., a fluorine atom, a chlorine atom, a bromine atom, or an iodine atom, and no hydrogen atom is included. $R^1$'s and $R^2$'s may be the same or different, but the case where all are hydrogen atoms is excluded. Preferably, any one of them is a fluorine atom, and more preferably, all are fluorine atoms.

In the above three kinds of formulas, Z is a divalent group of the formula:

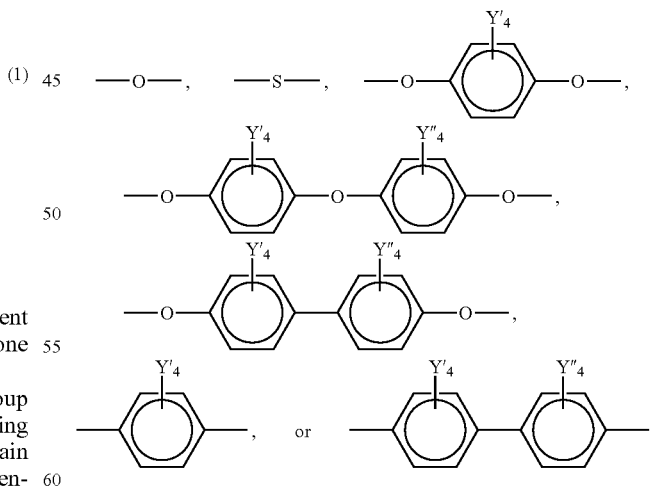

In the formulas representing the above "Z", Y's and Y"s each means a halogen atom, i.e., a fluorine atom, a chlorine atom, a bromine atom, or an iodine atom. Preferably, any one of them is a fluorine atom, and more preferably, all of them are fluorine atoms. In the formulas representing the above "Z", when both of Y's and Y"s exist, Y's and Y"s may be the same or different and may respectively be the same or different in the respective benzene rings, but the case where all are hydrogen atoms is not included. In these divalent groups, Z may preferably be a divalent group of the formula:

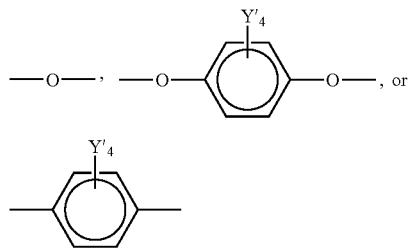

In the above formula (1), Y is a divalent organic group, and when X has no fluorine atoms, Y has to have a fluorine atom. Preferable examples of Y may include i) divalent halogen-containing aliphatic groups may optionally contain a linear chain or a branched chain or a ring, all consisting only of carbon-halogen bonds; halogen-containing aromatic group; and divalent halogen-containing organic groups in which two or more of the above aliphatic groups or aromatic groups are bonded through a heterogeneous atom other than a carbon atom, such as an oxygen atom, a nitrogen atom, or a sulfur atom. All of the halogen atoms are not required to be the same, and different halogen atoms may be contained in the "Y". The divalent halogen-containing aliphatic groups in the above i) may include divalent halogen-containing aliphatic organic groups derived from cyclic alkyls, chain alkyls, olefins, glycols, and the like; divalent halogen-containing aromatic organic groups derived from benzene, biphenyl, biphenyl ether, bisphenylbenzene, bisphenoxybenzene, and the like. In the "Y" also, all have no C—H bonds, and all of the hydrogen atoms in the C—H bonds may preferably be substituted with halogen atoms (any of a fluorine atom, a chlorine atom, a bromine atom, and an iodine atom).

In the above formula (1), the divalent organic group represented by Y may preferably be a divalent organic group represented below in i) or ii). Considering heat resistance, chemical resistance, water repellency, and low dielectric property, a divalent organic group represented below in ii) may be most preferable.

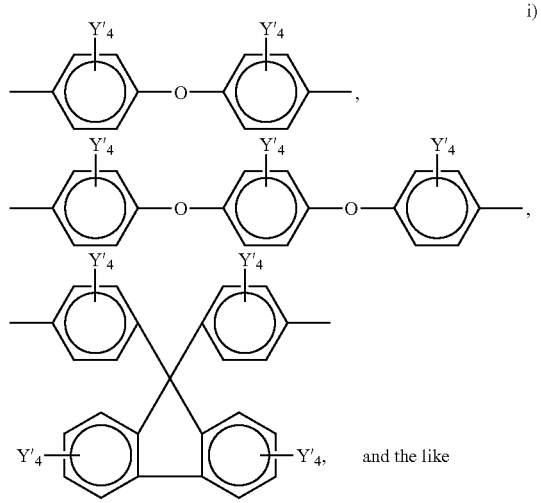

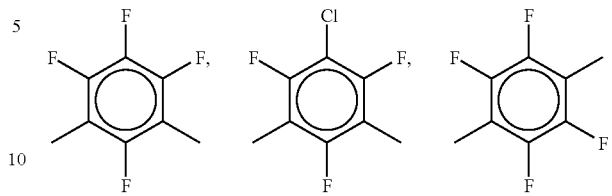

In the present invention, as described above, the halogenated polyamide acid having a repeating unit of the above formula (1) essentially contains a fluorine atom(s). The halogenated polyamide acid having a repeating unit of the above formula (1) can attain, by the presence of such a repeating unit, a desired refractive index (i.e., a refractive index difference Δn from the existing fluorinated polyimides) in the halogenated polyimide of the present invention formed therefrom. In the present invention, as the polyamide acid, those which have no carbon-hydrogen bonds (C—H bonds), that is, those in which all of hydrogen atoms bonded to carbon atoms forming the above formula (1) are substituted with halogen atoms (any of a fluorine atom, a chlorine atom, a bromine atom, and an iodine atom) may be preferable, considering a light transmission loss for near infrared region light, particularly in the optical communication wavelength region (i.e., in the range of from 1,000 to 1,700 nm). The halogenated polyamide acid having at least one or more of fluorine atoms is used. That is, this can become a starting material of a halogenated polyimide film which is excellent in heat resistance, chemical resistance, water repellency, dielectric property, electric property, and optical property.

Further, the production method of a halogenated polyamide acid having a repeating unit of the above formula (1) will be described below in detail. It is considered from the description that although the terminal of the polyamide acid may vary depending on the addition amounts (molar ratios) of a diamine compound and a tetra carboxylic acid derivative, it may be either of the amine terminal or the acid derivative terminal. Further, the polyamide acid may be those which have the same repeating unit or those which have different repeating units, in which latter case the repeating units may be of the block type or of the random type.

The polyamide acid can be produced by known techniques or combinations thereof, and the production method is not particularly limited. In general, there may preferably be used a process of reacting a diamine compound of formula (2) below (hereinafter referred to simply as "diamine compound" in some cases) with a tetracarboxylic acid of formula (3) below, its acid anhydride or acid chloride, or its esterified product (hereinafter referred to simply as "tetracarboxylic acids" in some cases). Further, the "Y" in formula (2) below and the "X" in formula (3) below are the same as defined in the above formula (1).

$$H_2N-Y-NH_2 \qquad (2)$$

-continued

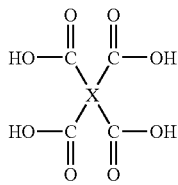
(3)

The diamine compound is not particularly limited, so long as it has a structure such that a halogenated polyamide acid having a repeating unit of the above formula (1) can be produced by being reacted with the tetracarboxylic acid and the like. The diamine compound may includes, by analogy with a preferable structure of the polyamide acid, i) 4,4'-diaminodipenyl ether, 2,2-dimethyl-4,4'-diaminobipenyl, 2,2-bis[4-(4-aminophenoxy)phenyl]propane, 1,4-bis (4-aminophenoxy)benzene, 9,9-bis(4-aminophenyl)fluorene;

ii) 5-chloro-1,3-diamino-2,4,6-trifluorobenzene, 2,4,5,6-tetrachloro-1,3-diaminobenzene, 2,4,5,6-tetrafluoro-1,3-diaminobenzene, 4,5,6-trichloro-1,3-diamino-2-fluorobenzene, 5-bromo-1,3-diamino-2,4,6-trifluorobenzene, and 2,4,5,6-tetrabromo-1,3-diaminobenzene. These diamine compounds may be used alone, or two or more kinds of them may also be used in combination. In these diamine compounds, 2,4,5,6-tetrafluoro-1,3-diaminobenzene and 5-chloro-1,3-diamino-2,4,6-trifluorobenzene may be particularly preferable.

On the other hand, the tetracarboxylic acids are not particularly limited and can be produced by known techniques, such as a process described in the Japanese Patent Application Laid-open (JP-A) No. 11-147955, or combinations thereof. The tetracarboxylic acids may includes halogenated tetracarboxylic acids such as hexafluoro-3,3',4,4'-biphenyltetracarboxylic acid, hexachloro-3,3',4,4'-biphenyltetracarboxylic acid, hexafluoro-3,3',4,4'-biphenylether tetracarboxylic acid, hexachloro-3,3',4,4'-biphenylether tetracarboxylic acid, bis (3,4-dicarboxytrifluorophenyl)sulfide, bis(3,4-dicarboxytrichlorophenyl)sulfide, 1,4-bis(3,4-dicarboxytrifluorophenoxy)-tetrafluorobenzene, 1,4-bis(3,4-dicarboxytrichlorophenoxy)-tetrafluorobenzene, 1,4-bis(3,4-dicarboxytrifluorophenoxy)-tetrachlorobenzene, 1,4-bis (3,4-dicarboxytrichlorophenoxy)-tetrachlorobenzene, 3,6-difluoropyromellitic acid, 3,6-dichloropyromellitic acid, and 3-chloro-6-fluoropyromellitic acid; their corresponding acid dianhydrides; their corresponding acid chlorides; and their esterified products such as methyl esters and ethyl esters. These tetracarboxylic acids may be used alone, or two or more kinds of them may also be used in combination. In these tetracarboxylic acids, hexafluoro-3,3',4,4'-biphenyltetracarboxylic acid, hexafluoro-3,3',4,4'-biphenylether tetracarboxylic acid, 1,4-bis(3,4-dicarboxytrifluorophenoxy)-tetrafluorobenzene, 1,4-bis(3,4-dicarboxytrifluorophenoxy)-tetrachlorobenzene, their corresponding acid dianhydrides, and their corresponding acid chlorides may be preferable, and hexafluoro-3,3',4,4'-biphenylether tetracarboxylic acid, 1,4-bis(3,4-dicarboxytrifluorophenoxy)-tetrafluorobenzene, 1,4-bis(3,4-dicarboxytrifluorophenoxy)-tetrachlorobenzene, and their corresponding acid dianhydrides may be particularly preferable.

The desired polyamide acid can be produced by a process of reacting a diamine compound with any of tetracarboxylic acids in an organic solvent.

The addition amount of the diamine compound may be an amount at which the diamine compound can be efficiently reacted with any of the tetracarboxylic acids, and is not particularly limited. Specifically, the addition amount of the diamine compound is stoichiometrically equimolar with any of the tetracarboxylic acids, but may preferably be 0.8 to 1.2 moles, more preferably 0.9 to 1.1 moles, when the total mole number of any of the tetracarboxylic acids is set to 1 mole. When the addition amount of the diamine compound is smaller than 0.8 moles, any of the tetracarboxylic acids may remain in large quantity, so that a purification step may be complicated, and the degree of polymerization may be unable to be increased. In contrast, when the addition amount of the diamine compound is greater than 1.2 moles, the diamine compound may remain in large quantity, so that a purification step may be complicated, and the degree of polymerization may be unable to be increased.

The reaction can be carried out in an organic solvent. The organic solvent is not particularly limited, so long as the reaction of the diamine compound with any of the tetracarboxylic acids can efficiently proceed and it is inactive for these starting materials. The organic solvent which can be used may include polar organic solvents such as N-methyl-2-pyrrolidinone, N,N-dimethylacetamide, N,N-dimethylformamide, dimethylsulfoxide, sulfolane, methyl isobutyl ketone, acetonitrile, and benzonitrile. These organic solvents may be used alone, or two or more kinds of them may also be used in combination. Further, the amount of organic solvent is not particularly limited, so long as it is an amount at which the reaction of the diamine compound with any of the tetracarboxylic acids can efficiently proceed. It may preferably be an amount at which the concentration of the diamine compound in the organic solvent is 1% to 80% by mass, more preferably 5% to 50% by mass.

The conditions of reaction of the diamine compound with any of the tetracarboxylic acids are not particularly limited, so long as these reactions can sufficiently proceed. For example, the reaction temperature may preferably be 0° C. to 100° C., more preferably 20° C. to 50° C. Further, the reaction time may usually be 1 to 144 hours, preferably 2 to 120 hours. Further, the reaction may be carried out under either pressure, i.e., under increased pressure, under normal pressure, or under reduced pressure, but may preferably be carried out under normal pressure. Further, the reaction of the diamine compound with any of the tetracarboxylic acids may preferably be carried out under a dry inert gas atmosphere, considering the reaction efficiency, the degree of polymerization, and the like. The relative humidity in the reaction atmosphere at this time may preferably be 10% RH or lower, more preferably 1% RH or lower. As the inert gas, nitrogen, helium, argon, or the like can be used.

<Metal Oxide Precursor>

In the composition of the present invention, it is necessary to blend a metal oxide precursor which causes reaction itself to generate a metal oxide at a treatment step, such as heat treatment or drying under reduced pressure, at which a halogenated polyimide is generated from a halogenated polyamide acid in the composition.

The metal oxide precursor to be blended in the composition of the present invention is specifically a metal alkoxy compound of formula (4):

$$(R^3O)_n MR^4_{4-n} \qquad (4)$$

wherein M is silicon or a tetravalent metal element, $R^3$'s and $R^4$'s each independently means an alkyl group having 1 to 5 carbon atoms, an allyl group, or an aryl group having 6 to 10 carbon atoms; and n is an integer of 1 to 4, preferably 3 or 4, and/or an alkoxysilane condensate of formula (5):

 (5)

wherein $R^5$'s each independently means a hydrogen atom, an alkyl group having 1 to 5 carbon atoms, an allyl group or an aryl group containing 6 to 10 carbon atoms; and n is 0 or an integer of 1 to 10.

In the above formula (4), silicon or a tetravalent metal element represented by M is not particularly limited, so long as a metal oxide generated from the metal oxide precursor by heat treatment changes the refractive index of a halogenated polyimide generated from a halogenated polyamide acid in the composition. Specifically, it may include silicon, titanium, and zirconium. In these silicon and tetravalent metal elements, silicon is used when the refractive index of a halogenated polyimide is decreased, and on the other hand, titanium and zirconium are used when the refractive index of a halogenated polyimide is increased.

In the above formula (4), an alkoxy compound in which M is silicon, that is, an alkoxysilane, and/or an alkoxysilane condensate of the above formula (5) generates silica by heat treatment. Further, in the above formula (4), an alkoxy compound in which M is titanium, that is, alkoxytitanium generates titanium oxide by heat treatment. Further, in the above formula (4), an alkoxy compound in which M is zirconium, that is, alkoxyzirconium generates zirconium oxide by heat treatment.

Further, in the above formulas (4) and (5), an alkyl group having 1 to 5 carbon atoms, an allyl group, and an aryl group containing 6 to 10 carbon atoms, which are represented by $R^3$, $R^4$, or $R^5$, may optionally have a substituent group, examples of which may include a hydroxy group, a carboxyl group, an amino group, a cyano group, a nitro group, an alkoxy group, and a halogen atom.

Specific examples of the metal oxide precursor to be blended in the composition of the present invention may include alkoxysilanes, such as tetramethoxysilane, tetraethoxysilane, tetrapropoxysilane, tetraisoprpoxysilane, tetrabutoxysilane, trimethoxymethylsilane, triethoxymethylsilane, tributoxymethylsilane, and tetraphenoxysilane, and their condensates; alkoxytitanium compounds such as tetramethoxytitanium, tetraethoxytitanium, tetrameisoprpoxytitanium, and tetra-n-butoxytitanium; alkoxyzirconium compounds such as tetramethoxyzirconium, tetraethoxyzirconium, tetra-n-propoxyzirconium, and tetra-n-butylzirconium. These metal oxide precursors may be used alone, or two or more of them may also be used in combination. In these metal oxide precursors, tetramethoxysilane and its condensate may be particularly preferable.

The blending amount of metal oxide precursors may preferably be 5% to 60% by mass, more preferably 10% to 50% by mass, and still more preferably 15% to 40% by mass, relative to the halogenated polyamide acid in the composition. When the blending amount of metal oxide precursors is lower than 5% by mass, the refractive index of the halogenated polyimide obtained cannot sufficiently be controlled. In contrast, when the blending amount of metal oxide precursors is greater than 60% by mass, the appearance of the halogenated polyimide obtained may be deteriorated.

As the metal oxide precursors to be blended in the composition of the present invention, metal chelate compounds can also be used. Specific examples of the metal chelate compounds may include titanium tetraacetylacetonate, zirconium tetraacetylacetonate, zirconium tributoxyacetylacetonate, zirconium dibuthoxybis(acetylacetonate), and zirconium butoxyacetylacetonate (ethylacetonate). These metal chelate compounds may be used alone, or two or more of them may also be used in combination.

<Catalyst>

A catalyst of reaction of generating a metal oxide from the metal oxide precursor may be blended in the composition of the present invention. The catalyst may be used alone without blending a coupling agent which is described below, or may also be used in combination with a coupling agent which is described below.

The catalyst to be blended in the composition of the present invention is not particularly limited, so long as it serves to promote the reaction of generating a metal oxide from the metal oxide precursor, but specific examples thereof may include acids such as hydrochloric acid, acetic acid, and oxalic acid; bases such as ammonia and organic amines; as well as trimethoxyborane and trimethyl phosphonate. These catalysts may be used alone, or two or more kinds of them may also be used in combination. In these catalysts, trimethoxyborane may be particularly preferable.

When a catalyst is blended in the composition, the blending amount of the catalyst may preferably be 0.02% to 15% by mass, more preferably 0.1% to 10% by mass, and still more preferably 0.2% to 5% by mass, relative to the halogenated polyamide acid in the composition. When the blending amount of catalyst is smaller than 0.02% by mass, a metal oxide cannot sufficiently be generated from the metal oxide precursor. In contrast, when the blending amount of catalyst is greater than 15% by mass, the action of the catalyst may be saturated, and the catalyst may be used more than necessary, resulting in an increase in production cost.

<Coupling Agent>

A coupling agent having a reactive group may be blended in the composition of the present invention. The coupling agent may be used alone without blending the above catalyst, or may also be used in combination with the above catalyst.

When a coupling agent having a reactive group is blended, silanol as the intermediate of a metal oxide is generated by the reaction of an alkoxysilane and/or its condensate with water, for example, when the alkoxysilane and/or its condensate are blended as the metal oxide precursor in the composition of the present invention, and the silanol is reacted with a halogenated polyamide acid through the coupling agent. It is considered that even if silica is generated from the silanol at the following treatment step such as heat treatment or drying under reduced pressure, the halogenated polyimide and the silica cause no phase separation because they are bonded with each other through the coupling agent.

The coupling agent to be blended in the composition of the present invention is not particularly limited, so long as it is a coupling agent having a reactive group which is reacted with a halogenated polyamide acid, but specific examples of the coupling agent may include silane coupling agents of formula (6):

 (6)

wherein A means an amino group, an N-aminoalkylamino group, a glycidoxy group, an isocyanate group, a vinyl group, an acryloxy group, a methacryloxy group, a mercapto group, or a halogen group; $R^6$ means an alkylene group having 1 to 10 carbon atoms; $R^7$'s and $R^8$'s each independently means an alkyl group having 1 to 5 carbon atoms, an allyl group, or an aryl group having 6 to 10 carbon atoms; and m is an integer of 0 to 3; and titanate type coupling agents of formula (7):

 (7)

wherein B's each independently means an amino group or an aminoalkylamino group; $R^9$ means an alkyl group having 1 to 5 carbon carbons, an allyl group, or an aryl group having 6 to 10 carbon atoms; and $R^{10}$'s each independently means an alkylene group having 1 to 10 carbon carbons.

In the above formula (6), the aminoalkylamino group represented by A may include a 2-aminoethylamino group and a 3-aminopropylamino group. In the above formula (6), the alkylene group having 1 to 10 carbon carbons represented by $R^6$ and the alkyl group having 1 to 5 carbon atoms, the allyl group, and the aryl group having 6 to 10 carbon atoms represented by $R^7$ or $R^8$ may optionally have a substituent group. The substituent group may include a hydroxy group, a carboxyl group, an amino group, a cyano group, a nitro group, an alkoxy group, and a halogen atom.

In the above formula (7), the aminoalkylamino group represented by B may include a 2-aminoethylamino group and a 3-aminopropylamino group. In the above formula (7), the alkyl group having 1 to 5 carbon atoms, the allyl group, and the aryl group having 6 to 10 carbon atoms represented by $R^9$, and the alkylene group having 1 to 10 carbon atoms represented by $R^{10}$ may optionally have a substituent group. The substituent group may include a hydroxy group, a carboxyl group, an amino group, a cyano group, a nitro group, an alkoxy group, and a halogen atom.

The specific example of the coupling agent to be blended in the composition of the present invention may include amino group-containing silane coupling agents such as γ-aminopropyltrimethoxysilane and γ-aminopropyltriethoxysilane; aminoalkylamino group-containing silane coupling agents such as γ-(2-aminoethyl)aminopropyltrimethoxysilane, γ-(2-aminoethyl)aminopropyltriethoxysilane, γ-(3-aminopropyl)aminopropyltrimethoxysilane, and γ-(3-aminopropyl)aminopropyltriethoxysilane; glycidoxy group-containing silane coupling agents such as γ-glycidoxypropyltrimethoxysilane, γ-glycidoxypropylmethyldimethoxysilane, and γ-glycidoxypropyltriethoxysilane; isocyanate group-containing silane coupling agents such as γ-isoyanatepropyltrimethoxysilane; vinyl group-containing silane coupling agents such as vinyl trimethoxysilane and vinyl triethoxysilane; acryloxy group-containing silane coupling agents such as γ-acryloxypropyltrimethoxysilane; methacryl group-containing silane coupling agents such as γ-methacryloxypropyltrimethoxysilane, γ-methacryloxypropylmethyldimethoxysilane, γ-methacryloxypropyltriethoxysilane, and γ-methacryloxypropylmethyldiethoxysilane; mercapto group-containing silane coupling agents such as γ-mercaptopropyltrimethoxysilane and γ-mercaptopropylmethyldimethoxysilane; halogen group-containing silane coupling agents such as γ-chloropropyltrimethoxysilane; amino group-containing titanate type coupling agents such as isopropyltri(5-aminopentyl) titanate, isopropyltri(6-aminohexyl) titanate, isopropyltri(7-aminoheptyl) titanate, and isopropyltri(8-aminooctyl) titanate; and aminoalkylamino group-containing titanate type coupling agents such as isopropyltri(2-aminoethyl-aminoethyl) titanate, isopropyltri(2-aminoethyl-aminopropyl) titanate, isopropyltri(3-aminoproyl-aminoethyl) titanate, and isopropyltri(3-aminopropyl-aminopropyl) titanate. These coupling agents may be used alone, or two or more kinds of them may also be used in combination. In these coupling agents, silane coupling agents may be preferable, and amino group-containing silane coupling agents such as γ-aminopropyltrimethoxysilane and γ-aminopropyltriethoxysilane may be particularly preferable.

When a coupling agent is blended in the composition, the blending amount of coupling agent may preferably be 1% to 20% by mass, more preferably 1.5% to 18% by mass, and still more preferably 2% to 15% by mass, relative to the halogenated polyamide acid in the composition. When the blending amount of coupling agent is smaller than 1% by mass, the halogenated polyamide acid and the metal oxide may cause phase separation after treatment such as heat treatment or drying under reduced pressure, so that the appearance, transparency, and surface flatness of the halogenated polyimide film may be decreased. In contrast, when the blending amount of coupling agent is greater than 20% by mass, gelation may be caused in the preparation of a halogenated polyamide acid composition.

<Water>

Water may be further added to the composition of the present invention. When water is added to the composition of the present invention, silanol as the intermediate of a metal oxide is generated by the reaction of an alkoxysilane and/or its condensate with water, for example, when the alkoxysilane and/or its condensate are blended to the composition of the present invention as the metal oxide precursor, and silica is easily generated from the silanol at the subsequent treatment step such as heat treatment or drying under reduced pressure. It is considered that when a catalyst is blended in the composition, the reaction generating the silanol is promoted by the catalyst. When water is added to the composition of the present invention, there is, for example, the effect of improving the surface glossiness of a halogenated polyimide film obtained by treatment such as heat treatment or drying under reduced pressure.

When water is blended in the composition, the adding amount of water may preferably be 0.1% to 40% by mass, more preferably 0.2% to 35% by mass, and still more preferably 0.5% to 30% by mass, relative to the halogenated polyamide acid in the composition.

<<Production of Halogenated Polyamide Acid Composition>>

The composition of the present invention can be produced in the form of a varnish by mixing a halogenated polyamide acid and a metal oxide precursor, which are essential components, and a catalyst of reaction of generating a metal oxide from the precursor, and/or a coupling agent having a reactive group, and water if necessary, in an appropriate proportion, followed by sufficient mixing and defoaming. As an apparatus and conditions to be used for the production of the composition of the present invention, any of known apparatuses and conditions may be applied, and is not particularly limited. Further, when water is added to the composition of the present invention, it may be added at any stage in the mixing of the respective components.

<<Halogenated Polyimide Film>>

The halogenated polyimide film of the present invention is obtained by forming the composition of the present invention in a film shape, followed by treatment such as heat treatment or drying under reduced pressure to cause ring closing of a halogenated polyamide acid in the composition.

The method of forming the composition of the present invention in a film shape may suitably be selected from known methods, and is not particularly limited. Specific examples thereof may include spin coating methods, casting methods, roll coating methods, spray coating methods, bar coating methods, and dip coating methods.

As a substrate to be used when the composition of the present invention is formed in a film shape, known materials can be used, irrespective of inorganic materials and organic materials, but for example, when a polyimide is baked by heat treatment, semiconductor substrates such as silicon; glass substrates such as quartz and Pyrex (registered trademark); metal substrates such as aluminum and copper; resin substrates such as polyimides and polyether ketones; organic-inorganic hybrid substrates; and the like may preferably be used from the viewpoint that no thermal deformation occurs at a temperature of heat treatment.

As the method and conditions for carrying out treatment such as heat treatment or drying under reduced pressure for the composition of the present invention formed in a film shape, any method and conditions capable of efficiently causing ring closing of a halogenated polyamide acid in the composition to produce a desired halogenated polyimide film may be employed, and is not particularly limited. Specifically, heat treatment may preferably be carried out at a temperature of about 70° C. to 350° C. usually in air, preferably under an inert gas atmosphere such as nitrogen, helium, or argon, preferably for about 2 to 5 hours. Further, heat treatment may be carried out continuously or stepwise. Drying under reduced pressure is usually carried out at normal temperature, under cooling or heating, preferably under reduced pressure of about $1.33 \times 10^{-1}$ Pa ($1 \times 10^{-3}$ Torr) to lower than $1.01 \times 10^5$ Pa (760 Torr), preferably for about 2 to 24 hours. Further, drying under reduced pressure may be carried out continuously or stepwise.

The thickness of the halogenated polyimide film of the present invention may suitably be selected depending on its application, and is not particularly limited. Specifically, the thickness of the halogenated polyimide film of the present invention may preferably be 5 to 200 μm, more preferably 10 to 150 μm. When the thickness of the halogenated polyimide film is smaller than 5 μm, the strength of the film may be decreased. In contrast, when the thickness of the halogenated polyimide film is greater than 200 μm, the transparency of the film may be decreased.

The halogenated polyimide forming the halogenated polyimide film of the present invention is specifically a polyimide having a repeating unit of formula (8):

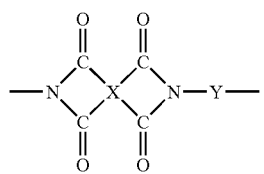

(8)

wherein X and Y are as defined in the above formula (1). Further, in the present invention, a halogenated polyimide containing a metal oxide generated from a metal oxide precursor by treatment such as heat treatment or drying under reduced pressure may be referred to simply as a "halogenated polyimide", and a halogenated polyimide film containing a metal oxide generated from a metal oxide precursor by treatment such as heat treatment or drying under reduced pressure may be referred to simply as a "halogenated polyimide film".

In the above formula (8), preferable specific examples of the tetravalent organic group represented by X and the divalent organic group represented by Y may include the above specific examples recited in the explanation of a halogenated polyamide acid.

The halogenated polyimide film of the present invention, when an alkoxysilane and/or its condensate are used as a metal oxide precursor in its production, contains silica having a low refractive index (about 1.45), and has a refractive index decreased in comparison with the same halogenated polyimide film not containing silica. Further, when an alkoxytitanium or an alkoxyzirconium is used as a metal oxide precursor, the halogenated polyimide film of the present invention contains titanium oxide or zirconium oxide each having a high refractive index (greater than 2), and has a refractive index increased in comparison with the same halogenated polyimide film not containing titanium oxide or zirconium oxide. Thus, in the present invention, the refractive index of the halogenated polyimide film obtained can be controlled by adjusting the kind and blending amount of metal oxide precursor. According to such a method, a halogenated polyimide film, of which refractive index at a wavelength of 1,550 nm is 1.520 or lower, preferably 1.510 or lower, at both of TE mode and TM mode, is obtained. The lower limit of the refractive index in the halogenated polyimide film is not particularly limited, but for example, it is 1.480 at both of TE mode and TM mode.

<<Optical Waveguide>>

In the present invention, the term "optical waveguide" as used herein means an optical circuit having a clad layer and a core layer, in which light injected in the optical waveguide is transmitted in the core layer while being reflected on the interface between the clad layer and the core layer and on the interface between the core layer and an air layer.

The clad layer and/or the core layer comprising a halogenated polyimide film are obtained by coating the composition of the present invention, then carrying out treatment such as heat treatment or drying under reduced pressure to cause ring closing of a halogenated polyamide acid in the composition. The optical waveguide of the present invention is characterized in that the relative refractive index difference between the clad layer and the core layer thus obtained is 0.6% or greater. The relative refractive index difference between the clad layer and the core layer may preferably be 1.6% or greater, more preferably 2.6% or greater. Further, the upper limit of the relative refractive index difference between the clad layer and the core layer is not particularly limited because it depends on a material forming the core layer, and the like.

As described above, in the present invention, the refractive index of the halogenated polyimide film obtained can be controlled by adjusting the kind and blending amount of metal oxide precursor. Therefore, the optical waveguide of the present invention is obtained by suitably selecting a halogenated polyimide forming the core layer and a halogenated polyimide forming the clad layer so that the relative refractive index difference becomes 0.6% or greater.

The halogenated polyimide forming the clad layer and/or the core layer is specifically a polyimide having a repeating unit of formula (8):

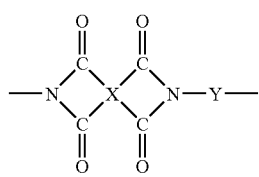

(8)

wherein X and Y is as defined in the above formula (1) and the kind of halogenated polyimide is selected so that the relative refractive index difference becomes 0.6% or greater.

In the above formula (8), preferable specific examples of the tetravalent organic group represented by X and the divalent organic group represented by Y may include the above specific examples recited in the explanation of a halogenated polyamide acid.

The optical waveguide of the present invention may have a structure which is not particularly limited, and can employ the same structures as used in all the optical waveguides which have been ordinarily produced so far, such as fiber types, planar types, and lens types, in addition to ridge types and embedded types.

As one embodiment of the present invention, the production method of a ridge type optical waveguide will be described below by reference to FIG. 1, but the present invention is not limited to the embodiment below and can be carried out by suitably changing it.

Firstly, a halogenated polyamide acid composition (e.g., the composition of the present invention) which is the precursor of a halogenated polyimide forming a lower clad layer 2 is applied dropwise to a substrate 1 such as silicon or quartz glass, and a film is formed by a spin coating method so as to have a prescribed thickness, followed by treatment such as heat treatment or drying under reduced pressure to the film, thereby forming the lower clad layer 2 made of the halogenated polyimide (A). Then, a halogenated polyamide acid composition (e.g., the composition of the present invention) which is the precursor of a halogenated polyimide forming a core layer 3 is applied dropwise to the lower clad layer (2), and a film is formed by a spin coating method so as to have a prescribed thickness, followed by treatment such as heat treatment or drying under reduced pressure to the film, thereby forming the core layer 3 made of the halogenated polyimide (B). Further, a photoresist is applied to the core layer 3, followed by pre-baking, exposure, development, and after-baking, thereby forming a patterned resist layer 4. Then, portions of the core layer 3, which are not covered with the resist layer 4, are removed by dry etching, and the resist layer 4 is peeled. Thus, obtained is a ridge type optical waveguide in which the lower clad layer 2 is made of the halogenated polyimide (A), the core layer 3 is made of the halogenated polyimide (B), and the upper clad layer is made of an air layer. The composition of the present invention is used for forming at least one of the lower clad layer 2 and the core layer 3.

Figure 2:
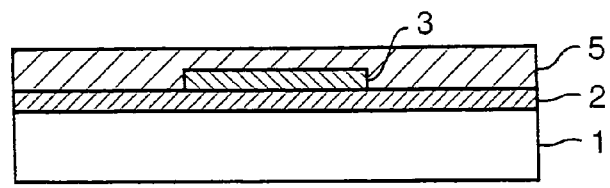
FIG. 2 is a sectional view for explanation of one example of the production method of an embedded type optical waveguide in the optical waveguides of the present invention.

Further, as another embodiment of the present invention, the production method of an embedded type optical waveguide will be described below by reference to FIG. 2, but the present invention is not limited to the embodiment below and can be carried out by suitably changing it. In FIG. 2, numerals 1 to 3 have the same meanings as those in FIG. 1, and numeral 5 means an upper clad layer.

First, using the same method as described in the above embodiment, a lower clad layer 2 made of the halogenated polyimide (A), which is obtained by carrying out treatment such as heat treatment or drying under reduced pressure to a halogenated polyamide acid composition on a substrate 1, and a core layer 3 made of the halogenated polyimide (B) which has been patterned is formed on the lower clad layer 2. Then, a halogenated polyamide acid composition (e.g., the composition of the present invention) which is the precursor of a halogenated polyimide forming an upper clad layer is applied dropwise to the core layer 3 and to portions of the lower clad layer (2) which are not covered with the core layer 3, and a film is formed by a spin coating method so as to have a prescribed thickness, followed by treatment such as heat treatment or drying under reduced pressure to the film, thereby forming an upper clad layer 5 made of the halogenated polyimide (C). Thus, obtained is an embedded type optical waveguide in which the lower clad layer 2 is made of the halogenated polyimide (A), the core layer 3 is made of the halogenated polyimide (B), and the upper clad layer 5 is made of the halogenated polyimide (C). The composition of the present invention is used for forming at least one of the lower clad layer 2, the core layer 3, and the upper clad layer 5. However, the halogenated polyimides forming the lower clad layer 2 and the upper clad layer 5, respectively, may preferably be formed from the same composition.

In the optical waveguide of the present invention, the thicknesses of the lower clad layer, the core layer, and the upper clad layer may suitably be set depending on the structure and applications of the optical waveguide, the wavelength of light used for communication, and the like, and are not particularly limited. For example, in case of a ridge type optical waveguide, the thicknesses of the lower clad layer and the core layer are usually 1 to 50 μm, and in case of an embedded type optical waveguide, the thicknesses of the lower clad layer, the core layer, and the upper clad layer are usually 1 to 50 μm.

The relative refractive index difference between the core layer and the clad layer is 0.6% or greater in the optical waveguide of the present invention, so that the bending loss of the optical waveguide is decreased, thereby making it possible to decrease its bending radius. As a result, when the optical waveguide of the present invention is used, an optical circuit can be downsized.

<<Optical Waveguide Device>>

The optical waveguide of the present invention is used for various optical waveguide devices. The optical waveguide device of the present invention is characterized in that it comprises the optical waveguide of the present invention. The term "optical waveguide device" as used herein means a device comprising an optical waveguide, specific examples of which may include optical multiplexers, optical branching filters, splitters, photoelectric transducers, wavelength filters, and AWGs. The optical waveguide device of the present invention is the same as any of known optical waveguide devices, except that the optical waveguide is the optical waveguide of the present invention. Accordingly, portions other than the optical waveguide may be formed in the same manner as any of known optical waveguide devices. That is, the optical waveguide device of the present invention is obtained by replacing the optical waveguide in any of known optical waveguide devices with the optical waveguide of the present invention.

EXAMPLES

The present invention will be described below in detail by reference to Examples and Comparative Examples, but the present invention is not limited to these Examples. The present invention can be put into practice after appropriate modifications or variations within a range meeting the gists described above and later, all of which are included in the technical scope of the present invention.

First, the measurement method of the refractive indices of the polyimide films obtained in Examples 1 to 3, Examples 6 to 8, and Comparative Examples 1 and 3 will be described below.

<Measurement of Refractive Indices>

The refractive indices of the polyimide films were measured for TE mode at which the electric field vector of incident light is parallel to the film surface and for TM mode at which the electric field vector of incident light is perpendicular to the film surface, using a prism coupler SPA-4000 (available from SAIRON TECHNOLOGY INC.). The wavelength of light used for the measurement of refractive indices was 1,550 nm in the near infrared region. The relative refractive index difference between the core layer and the clad layer, that is, the relative refractive index difference of a polyimide film for the core layer from a polyimide film for the clad layer was calculated by the expression: [(Refractive index of polyimide film for core layer−Refractive index of polyimide film for clad layer)/(Refractive index of polyimide film for clad layer)]×100 (%).

Then, Synthesis Examples of the halogenated polyamide acid solutions used in Examples 1 to 11 and Comparative Examples 1 to 6 will be described below.

Synthesis Example 1

A 50-mL three-necked flask was charged with 1.80 g (10 mmol) of 1,3-diamino-2,4,5,6-tetrafluorobenzene, 5.82 g (10 mmol) of 4,4'-[(2,3,5,6-tetrafluoro-1,4-phenylene)bis(oxy)]bis(3,5,6-trifluorophthalic anhydride) of formula 9:

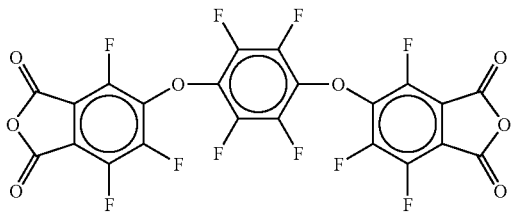

(9)

and 12.4 g of N,N-dimethylacetoamide. The mixture was stirred at room temperature in a nitrogen atmosphere for 6 days to give a halogenated polyamide acid solution (solid content: 38.0% by mass).

Synthesis Example 2

A 50-mL three-necked flask was charged with 1.97 g (10 mmol) of 5-chloro-1,3-diamino-2,4,6-trifluorobenzene, 5.82 g (10 mmol) of 4,4'-[(2,3,5,6-tetrafluoro-1,4-phenylene)bis(oxy)]-bis(3,5,6-trifluorophthalic anhydride) used in Synthesis Example 1, and 15.8 g of N,N-dimethylacetoamide. The mixture was stirred at room temperature in a nitrogen atmosphere for 6 days to give a halogenated polyamide acid solution (solid content: 33.0% by mass).

Synthesis Example 3

A 50-mL three-necked flask was charged with 1.97 g (10 mmol) of 5-chloro-1,3-diamino-2,4,6-trifluorobenzene, 5.82 g (10 mmol) of 4,4'-[(2,3,5,6-tetrafluoro-1,4-phenylene)bis(oxy)]-bis(3,5,6-trifluorophthalic anhydride) used in Synthesis Example 1, and 10.75 g of N,N-dimethylacetoamide. The mixture was stirred at room temperature in a nitrogen atmosphere for 6 days to give a halogenated polyamide acid solution (solid content: 42.0% by mass). To the halogenated polyamide acid solution, bis(pentafluorophenyl)sulfide was added so as to become 25% by mass of total sold content (accordingly, the halogenated polyamide acid is 75% by mass of total solid content), and the mixture was stirred and defoamed using a self/centrifugal double rotation mixer (trade name: "AWATORI RENTARO", available form Thinky Corporation) to give a halogenated polyamide acid composition for the core layer.

Then, production examples of halogenated polyimide films (hereinafter referred to simply as the "polyimide film(s)" in some cases) using halogenated polyamide acid compositions each containing a halogenated polyamide acid, a metal oxide precursor, and a catalyst of reaction of generating a metal oxide from the precursor will be described below in Examples 1 to 3.

Example 1

To 10 g of the halogenated polyamide acid solution obtained in Synthesis Example 1 were added 1.52 g of tetramethoxysilane and 0.01 g of trimethoxyborane, and the mixture was stirred and defoamed using a self/centrifugal double rotation mixer to give a halogenated polyamide acid composition.

The composition obtained was applied dropwise to a silicon substrate, a film was formed by a spin coating method, and the film was continuously heated for 1 hour in a baking furnace at 340° C., of which atmosphere was replaced with nitrogen gas, to give the polyimide film (I) having a thickness of 10 μm. The refractive index of the polyimide film (I) was measured to be 1.519 in the TE mode and 1.512 in the TM mode at a wavelength of 1,550 nm. The results are shown in Table 1.

A film was formed by a spin coating method in the same manner as described above, except the halogenated polyamide acid solution obtained in Synthesis Example 2 was used, and heat treatment was continuously carried out to give the polyimide film (II) having a thickness of 10 μm. The refractive index of the polyimide film (II) was measured to be 1.530 in the TE mode and 1.524 in the TM mode at a wavelength of 1,550 nm. The relative refractive index difference between the polyimide film (I) and the polyimide film (II) was 0.72% in the TE mode and 0.79% in the TM mode. The results are shown in Table 1.

Example 2

To 10 g of the halogenated polyamide acid solution obtained in Synthesis Example 1 were added 1.52 g of a tetramethoxysilane condensate (trade name: "M Silicate 51", available from Tama Chemicals Co., Ltd.) and 0.01 g of trimethoxyborane, and the mixture was stirred and defoamed using a self/centrifugal double rotation mixer to give a halogenated polyamide acid composition.

The composition obtained was applied dropwise to a silicon substrate, a film was formed by a spin coating method, and the film was continuously heated for 1 hour in a baking furnace at 340° C., of which atmosphere was replaced with nitrogen gas, to give the polyimide film (III) having a thickness of 10 μm. The refractive index of the polyimide film (III) was measured to be 1.506 in the TE mode and 1.500 in the TM mode at a wavelength of 1,550 nm. The relative refractive index difference between the polyimide film (III) and the polyimide film (II) obtained in Example 1 was 1.59% in the TE mode and 1.60% in the TM mode. The results are shown in Table 1.

Example 3

To 10 g of the halogenated polyamide acid solution obtained in Synthesis Example 1 were added 1.52 g of tetramethoxysilane, 0.01 g of trimethoxyborane, and 0.72 g of water, and the mixture was stirred and defoamed using a self/centrifugal double rotation mixer to give a halogenated polyamide acid composition.

The composition obtained was applied dropwise to a silicon substrate, a film was formed by a spin coating method, and the film was continuously heated for 1 hour in a baking furnace at 340° C., of which atmosphere was replaced with nitrogen gas, to give the polyimide film (IV) having a thickness of 10 μm. The refractive index of the polyimide film (IV) was measured to be 1.508 in the TE mode and 1.501 in the TM mode at a wavelength of 1,550 nm. The relative refractive index difference between the polyimide film (IV) and the polyimide film (II) obtained in Example 1 was 1.44% in the TE mode and 1.53% in the TM mode. The results are shown in Table 1.

Comparative Example 1

The experiment of Example 1 was repeated, except that tetramethoxysilane and trimethoxyborane were not added in Example 1, to give the polyimide film (V) having a thickness of 10 μm. The refractive index of the polyimide film (V) was measured to be 1.522 in the TE mode and 1.515 in the TM mode at a wavelength of 1,550 nm. The relative refractive index difference between the polyimide film (V) and the polyimide film (II) obtained in Example 1 was 0.53% in the TE mode and 0.59% in the TM mode. The results are shown in Table 1.

TABLE 1

| Polyimide film | Refractive index for light at a wavelength of 1,550 nm | | Relative refractive index difference (%) | |
|---|---|---|---|---|
| | TE mode | TM mode | TE mode | TM mode |
| Example 1 I | 1.519 | 1.512 | 0.72 | 0.79 |
| II | 1.530 | 1.524 | | |
| Example 2 III | 1.506 | 1.500 | 1.59 | 1.60 |
| II | 1.530 | 1.524 | | |
| Example 3 IV | 1.508 | 1.501 | 1.44 | 1.53 |
| II | 1.530 | 1.524 | | |
| Comp. Ex. 1 V | 1.522 | 1.515 | 0.53 | 0.59 |
| II | 1.530 | 1.524 | | |

As can be seen from Table 1, the polyimide film (I) of Example 1 was obtained by addition of the tetramethoxysilane as the metal oxide precursor and trimethoxyborane as the catalyst to the halogenated polyamide acid, followed by heat treatment; therefore, the relative refractive index difference from the polyimide film (II) is greater than 0.7% in the TE mode and reached about 0.8% in the TM mode at a wavelength of 1,550 nm. Further, the polyimide film (III) of Example 2 was obtained by addition of the tetramethoxysilane as the metal oxide precursor and trimethoxyborane as the catalyst to the halogenated polyamide acid, followed by heat treatment; therefore, the relative refractive index difference from the polyimide film (II) reached about 1.6% both in the TE mode and in the TM mode at a wavelength of 1,550 nm. The polyimide film (IV) of Example 3 was obtained by addition of the tetramethoxysilane as the metal oxide precursor, trimethoxyborane as the catalyst, and water to the halogenated polyamide acid, followed by heat treatment; therefore, the relative refractive index difference from the polyimide film (II) is greater than 1.4% in the TE mode and reached about 1.6% in the TM mode at a wavelength of 1,550 nm.

In contrast, the polyimide film (V) of Comparative Example 1 was obtained by addition of neither metal oxide precursor nor the catalyst, followed by heat treatment; therefore, the relative refractive index difference against the polyimide film (II) was smaller than 0.6% both in the TE mode and in the TM mode at a wavelength of 1,550 nm.

Thus, it is found that the halogenated polyamide acid composition of the present invention containing the halogenated polyamide acid, metal oxide precursor and the catalyst of reaction for preparing metal oxide from the precursor provides the halogenated polyimide film in which the refractive index is controlled.

Then, production examples of optical waveguides using the halogenated polyamide acid composition prepared in Example 1 and the halogenated polyamide acid solution obtained in Synthesis Example 1 or 2 are illustrated in Examples 4 to 5.

Example 4

The halogenated polyamide acid composition prepared in Example 1 was applied dropwise to a silicon substrate, a film was formed by a spin coating method so that a film thickness after heat treatment became 15 μm, and the film was continuously heated for 1 hour in a baking furnace at 340° C. to give a lower clad layer made of the halogenated polyimide (A). The halogenated polyamide acid solution prepared in Synthesis Example 1 was applied dropwise to the lower clad layer, a film was formed by a spin coating method so that a film thickness after heat treatment became 8 μm, and the film was continuously heated for 1 hour in a baking furnace at 340° C. to give a core layer made of the halogenated polyimide (B).

A resist liquid (trade name: "FH-SP3CL", available from Fuji Film Arch Co.) was applied to these halogenated polyimide films, followed by pre-baking at 90° C. for 2 minutes, exposure to UV light, development, and after-baking at 110° C. for 5 minutes, to give a resist layer with a linear pattern having a width of 8 μm and a length of 50 mm.

Then, oxygen ion etching was carried out using a reactive ion etching device (trade name: "L-451DMKII", available from Canon ANELVA Corporation), and the remaining resist layer was peeled, thereby forming a ridge type optical waveguide, in which the lower clad layer was made of the halogenated polyimide (A), the core layer was made of the halogenated polyimide (B) and the upper clad layer was made of an air layer.

Further, the halogenated polyamide acid composition prepared in Example 1 was applied dropwise thereto, a film was formed by a spin coating method so that a film thickness became 15 μm, and the film was continuously heated for 1 hour in a baking furnace at 340° C. to give an upper clad layer made of the halogenated polyimide (A). The edge faces of an optical waveguide were cut using a dicing saw (trade name: "DAD 321", available from DISCO Corporation), thereby forming an embedded type linear optical waveguide having a length of 50 mm. The optical waveguide is an embedded type optical waveguide, in which the lower clad layer was made of the halogenated polyimide (A), the core layer was made of the halogenated polyimide (B), and the upper clad layer was made of the halogenated polyimide (A).

<Near Field Pattern Test>

After light at a wavelength of 1,310 nm was injected in the edge portion of the optical waveguide obtained, through matching oil with a bat joint by a single mode fiber having a core diameter of 10 μm, a near field pattern was observed. Further, emitted light was received through matching oil with a bat joint by a single mode fiber having a core diameter of 10 μm, and the loss of the optical waveguide was measured. The results are shown in Table 2.

Example 5

An embedded type optical waveguide was obtained in the same manner as described in Example 4, except that a halogenated polyamide acid composition was prepared in the same manner as described in Example 1 using the halogenated polyamide acid solution obtained in Synthesis Example 2, in place of the halogenated polyamide acid solution obtained in Synthesis Example 1, and a lower clad layer and an upper clad layer were then formed. Using the embedded type optical waveguide obtained, the near field pattern test was carried out. The results are shown in Table 2.

Comparative Example 2

An embedded type optical waveguide was obtained in the same manner as described in Example 4, except that a lower clad layer and an upper clad layer were formed using a halogenated polyamide acid solution to which tetramethoxysilane and trimethoxyborane were not added, in place of the halogenated polyamide acid solution prepared in Example 1. Using the embedded type optical waveguide obtained, the near field pattern test was carried out. The results are shown in Table 2.

TABLE 2

|  | Loss for light at a wavelength of 1,310 nm (dB/cm) | Near field pattern |
|---|---|---|
| Example 4 | 0.1 | Multi mode |
| Example 5 | 0.1 | Multi mode |
| Comp. Ex. 2 | 0.1 | Single mode |

As can be seen from Table 2, the loss for light at a wavelength of 1,310 nm of the optical waveguides of Examples 4 and 5 and Comparative Example 2 are the same level. However, the near field patterns of the optical waveguides of Examples 4 and 5 were multi mode, indicating that a difference in refractive index between the clad layer and the core layer is great. The near field pattern of the optical waveguide of Comparative Example 2 was single mode, indicating that a difference in refractive index between the clad layer and the core layer is small.

Then, production examples of halogenated polyimide films (hereinafter referred to simply as the "polyimide film" in some cases) using the halogenated polyamide acid compositions each containing a halogenated polyamide acid, a metal oxide precursor, and a coupling agent having a reactive group will be described below in Examples 6 to 8.

Example 6

To 10 g of the halogenated polyamide acid solution obtained in Synthesis Example 1 was added a solution containing 0.2 g of γ-aminopropyltrimethoxysilane dissolved in 5 g of N,N-dimethylacetoamide, and the mixture was stirred using a self/centrifugal double rotation mixer (trade name: "AWATORI RENTARO", available from Thinky Corporation). To the solution were added 1.52 g of tetramethoxysilane and 0.36 g of water, and the mixture was stirred and defoamed using a self/centrifugal double rotation mixer (trade name: "AWATORI RENTARO", available from Thinky Corporation) to give a halogenated polyamide acid composition.

The composition obtained was applied dropwise to a silicon substrate, a film was formed by a spin coating method, and the film was continuously heated for 1 hour in a baking furnace at 250° C., of which atmosphere was replaced with nitrogen gas, to give a transparent polyimide film (VI) having a thickness of 10 μm. The refractive index of the polyimide film (VI) was measured to 1.511 in the TE mode and 1.507 in the TM mode at a wavelength of 1,550 nm. The polyimide film (VI) was excellent in transparency and surface flatness and had good appearance. The results are shown in Table 3.

A film was formed by a spin coating method in the same manner as described above, except that the halogenated polyamide acid solution obtained in Synthesis Example 2 was used, and heat treatment was continuously carried out to give the polyimide film (VII) having a thickness of 10 μm. The refractive index of the polyimide film (VII) was measured to be 1.533 in the TE mode and 1.528 in the TM mode at a wavelength of 1,550 nm. The polyimide film (VII) was excellent in transparency and surface flatness and had good appearance. The relative refractive index difference between the polyimide film (VI) and the polyimide film (VII) was 1.5% in the TE mode and 1.4% in the TM mode. The results are shown in Table 3.

Example 7

To 10 g of the halogenated polyamide acid solution obtained in Synthesis Example 1 was added a solution containing 0.4 g of γ-aminopropyltrimethoxysilane dissolved in 5 g of N,N-dimethylacetoamide, and the mixture was stirred using a self/centrifugal double rotation mixer (trade name: "AWATORI RENTARO", available from Thinky Corporation). To the solution were added 1.90 g of a tetramethoxysilane condensate (trade name: "M Silicate 51", available from Tama Chemicals Co., Ltd.) and 0.36 g of water, and the mixture was stirred and defoamed using a self/centrifugal double rotation mixer (trade name: "AWATORI RENTARO", available from Thinky Corporation) to give a halogenated polyamide acid composition.

The composition obtained was applied dropwise on a silicon substrate, a film was formed by a spin coating method, and the film was continuously heated for 1 hour in a baking furnace at 250° C., of which atmosphere was replaced with nitrogen gas, to give the transparent polyimide film (VIII) having a thickness of 10 μm. The refractive index of the polyimide film (VIII) was measured to be 1.507 in the TE mode and 1.501 in the TM mode at a wavelength of 1,550 nm. The polyimide film (VI) was excellent in transparency and surface flatness and had good appearance. The relative refractive index difference between the polyimide film (VIII) and the polyimide film (VII) obtained in Example 6 was 1.7% in the TE mode and 1.8% in the TM mode. The results are shown in Table 3.

Example 8

To 10 g of the halogenated polyamide acid solution obtained in Synthesis Example 1 was added a solution containing 0.4 g of γ-aminopropyltrimethoxysilane dissolved in 5 g of N,N-dimethylacetoamide, and the mixture was stirred using a self/centrifugal double rotation mixer (trade name: "AWATORI RENTARO", available from Thinky Corporation). To the solution were added 1.52 g of trifluoropropyltrimethoxysilane and 0.18 g of water, and the mixture was stirred and defoamed using a self/centrifugal double rotation mixer (trade name: "AWATORI RENTARO", available from Thinky Corporation) to give a halogenated polyamide acid composition.

The composition obtained was applied dropwise to a silicon substrate, a film was formed by a spin coating method, and the film was continuously heated for 1 hour in a baking furnace at 250° C., of which atmosphere was replaced with nitrogen gas, to give the transparent polyimide film (IX) having a thickness of 10 μm. The refractive index of the polyimide film (IX) was measured to be 1.490 in the TE mode and 1.484 in the TM mode at a wavelength of 1,550 nm. The polyimide film (IX) was excellent in transparency and surface flatness and had good appearance. The relative refractive index difference between the polyimide film (IX) and the polyimide film (VII) obtained in Example 6 was 2.9% in the TE mode and 3.0% in the TM mode. The results are shown in Table 3.

Comparative Example 3

The experiment of Example 6 was repeated, except that γ-aminopropyltrimethoxysilane, tetramethoxysilane, and water were not added in Example 6, to give the transparent polyimide film (X) having a thickness of 10 μm. The refractive index of the polyimide film (X) was measured to be 1.526 in the TE mode and 1.521 in the TM mode at a wavelength of 1,550 nm. The polyimide film (X) was excellent in transparency and surface flatness and had good appearance. The relative refractive index difference between the polyimide film (X) and the polyimide film (VII) obtained in Example 6 was 0.5% in the TE mode and 0.5% in the TM mode. The results are shown in Table 3.

Comparative Example 4

The experiment of Example 7 was repeated, except that an N,N-dimethylacetoamide solution of γ-aminopropyltrimethoxysilane were not added in Example 7, to give the transparent polyimide film (XI) having a thickness of 10 μm. However, the polyimide film (XI) was opaque and had deteriorated appearance.

ference from the polyimide film (VII) reached 2.9% in the TE mode and 3.0% in the TM mode at a wavelength of 1,550 nm.

In contrast, the polyimide film (X) of Comparative Example 3 was obtained by adding neither a metal oxide precursor nor a coupling agent nor water, followed by heat treatment; therefore, the relative refractive index difference from the polyimide film (VII) was 0.5% both in the TE mode and in the TM mode at a wavelength of 1,550 nm. Further, the polyimide film (XI) of Comparative Example 4 was obtained by adding tetramethoxysilane as the metal oxide precursor and water, but adding no coupling agent; therefore, it was opaque and had deteriorated appearance.

Thus, it is understood that the halogenated polyamide acid composition of the present invention comprising a halogenated polyamide acid, a metal oxide precursor, a coupling agent having a functional group which reacts with the halogenated polyamide acid, and water provides a halogenated polyimide film having a greatly changed refractive index.

Then, production examples of optical waveguides using the halogenated polyamide acid composition prepared in Example 6 or 8 and the halogenated polyamide acid solution obtained in Synthesis Example 2 will be described below in Examples 9 to 10.

Example 9

The halogenated polyamide acid composition prepared in Example 6 was applied dropwise to a silicon substrate, a film

TABLE 3

| | Polyimide film | Refractive index for light at a wavelength of 1,550 nm | | Relative refractive index difference (%) | | Film appearance |
|---|---|---|---|---|---|---|
| | | TE mode | TM mode | TE mode | TM mode | |
| Example 6 | VI | 1.511 | 1.507 | 1.5 | 1.4 | good |
| | VII | 1.533 | 1.528 | | | good |
| Example 7 | VIII | 1.507 | 1.501 | 1.7 | 1.8 | good |
| | VII | 1.533 | 1.528 | | | good |
| Example 8 | IX | 1.490 | 1.484 | 2.9 | 3.0 | good |
| | VII | 1.533 | 1.528 | | | good |
| Comp. Ex. 3 | X | 1.526 | 1.521 | 0.5 | 0.5 | good |
| | VII | 1.533 | 1.528 | | | good |
| Comp. Ex. 4 | XI | — | — | — | — | bad |
| | | — | — | | | |

As can be seen from Table 3, the polyimide film (VI) of Example 6 was obtained by adding tetramethoxysilane as the metal oxide precursor and γ-aminopropyltrimethoxysilane as the coupling agent to a halogenated polyamide acid, followed by heat treatment; therefore, the relative refractive index difference from the polyimide film (VII) reached 1.5% in the TE mode and 1.4% in the TM mode at a wavelength of 1,550 nm. Further, the polyimide film (VIII) of Example 7 was obtained by adding tetramethoxysilane as the metal oxide precursor, γ-aminopropyltrimethoxysilane as the coupling agent, and water to a halogenated polyamide acid, followed by heat treatment; therefore, the relative refractive index difference from the polyimide film (VII) reached 1.7% in the TE mode and 1.8% in the TM mode at a wavelength of 1,550 nm. Further, the polyimide film (IX) of Example 8 was obtained by adding trifluoropropyltrimethoxysilane as the metal oxide precursor, γ-aminopropyltrimethoxysilane as the coupling agent, and water to a halogenated polyamide acid, followed by heat treatment; therefore, the relative refractive index difwas formed by a spin coating method so that a film thickness after heat treatment became 15 μm, and the film was continuously heated for 1 hour in a baking furnace at 250° C., to give a lower clad layer made of the halogenated polyimide (C) The halogenated polyamide acid solution prepared in Synthesis Example 2 was applied dropwise to the lower clad layer, a film was formed by a spin coating method so that a film thickness after heat treatment became 8 μm, and the film was continuously heated for 1 hour in a baking furnace at 250° C., to give a core layer made of the halogenated polyimide (D).

A resist liquid (trade name: "FH-SP3CL", available from Fuji Film Arch Co.) was applied to these halogenated polyimide films, followed by pre-baking at 90° C. for 2 minutes, exposure to UV light, development, and after-baking at 110° C. for 5 minutes, to give a resist layer with a linear pattern having a width of 8 μm and a length of 50 mm.

Then, oxygen ion etching was carried out using a reactive ion etching device (trade name: "L-451DMKII", available from Canon ANELVA Corporation), and the remaining resist layer was peeled, thereby forming a ridge type optical waveguide, in which the lower clad layer was made of the halogenated polyimide (C), the core layer was made of the halogenated polyimide (D), and the upper clad layer was made of an air layer.

Further, the halogenated polyamide acid composition prepared in Example 6 was applied dropwise thereto, a film was formed by a spin coating method so that a film thickness became 15 μm, and the film was continuously heated for 1 hour in a baking furnace at 250° C. to give an upper clad layer made of the halogenated polyimide (C). The edge faces of an optical waveguide were cut using a dicing saw (trade name: "DAD 321", available from DISCO Corporation), thereby forming an embedded type linear optical waveguide having a length of 50 mm. The optical waveguide is an embedded type optical waveguide, in which the lower clad layer was made of the halogenated polyimide (C), the core layer was made of the halogenated polyimide (D), and the upper clad layer was made of the halogenated polyimide (C).

<Near Field Pattern Test>

After light at a wavelength of 1,310 nm was injected in the edge portion of the optical waveguide obtained, through matching oil with a bat joint by a single mode fiber having a core diameter of 10 μm, a near field pattern was observed. Further, emitted light was received through matching oil with a bat joint by a single mode fiber having a core diameter of 10 μm, and the loss of the optical waveguide was measured. The results are shown in Table 4.

Example 10

An embedded type optical waveguide was obtained in the same manner as described in Example 9, except that a lower clad layer and an upper clad layer were formed using the halogenated polyamide acid composition prepared in Example 8, in place of the halogenated polyamide acid composition prepared in Example 6. Using the embedded type optical waveguide obtained, the near field pattern test was carried out. The results are shown in Table 4.

Comparative Example 5

An embedded type optical waveguide was obtained in the same manner as described in Example 9, except that a lower clad layer and an upper clad layer were formed using a halogenated polyamide acid solution to which γ-aminopropyltrimethoxysilane, tetramethoxysilane, and water were not added, in place of the halogenated polyamide acid composition prepared in Example 6. Using the embedded type optical waveguide obtained, the near field pattern test was carried out. The results are shown in Table 4.

Comparative Example 6

An embedded type optical waveguide was obtained in the same manner as described in Example 9, except that a lower clad layer and an upper clad layer were formed using a halogenated polyamide acid solution to which an N,N-dimethylacetoamide solution of γ-aminopropyltrimethoxysilane was not added, in place of the halogenated polyamide acid composition prepared in Example 7. Using the embedded type optical waveguide obtained, the near field pattern test was carried out. The results are shown in Table 4.

TABLE 4

|  | Loss for light at a wavelength of 1,310 nm (dB/cm) | Near field pattern |
| --- | --- | --- |
| Example 9 | 0.1 | Multi mode |
| Example 10 | 0.1 | Multi mode |
| Comp. Ex. 5 | 0.1 | Single mode |
| Comp. Ex. 6 | 3.0 | Multi mode |

As can be from Table 4, the loss for light at a wavelength of 1,310 nm of the optical waveguides of Examples 9 and 10 and Comparative Example 5 are the same level. However, the near field patterns of the optical waveguides of Examples 9 and 10 were multi mode, indicating that a difference in refractive index between the clad layer and the core layer is great. The near field pattern of the optical waveguide of Comparative Example 5 was single mode, indicating that a difference in refractive index between the clad layer and the core layer is small. Further, the near field pattern of the optical waveguide of Comparative Example 6 is multi mode, indicating that a difference in refractive index between the clad layer and the core layer is great, but the loss for light at a wavelength of 1,310 nm was great, indicating that this optical waveguide is not suitable.

Then, production example of a large diameter embedded type optical waveguide using the halogenated polyamide acid composition prepared in Example 8 and the halogenated polyamide acid composition obtained in Synthesis Example 3 will be described below in Example 11.

Example 11

The halogenated polyamide acid composition prepared in Example 8 was applied dropwise to a silicon substrate, a film was formed by a spin coating method so that a film thickness after heat treatment became 15 μm, and the film was continuously heated for 4 hours in a baking furnace at 250° C., of which atmosphere was replaced with nitrogen gas, to give a lower clad layer. The halogenated polyamide acid composition prepared in Synthesis Example 3 was applied dropwise to the lower clad layer, a film was formed by a spin coating method so that a film thickness after heat treatment became 50 μm, and the film was continuously heated for 4 hours in a baking furnace at 250° C., of which atmosphere was replaced with nitrogen gas, to give a core layer on the lower clad layer.

Then, two grooves each having a depth of 50 μm were cut in the clad layer using a dicing saw (trade name: "DAD 321", available from DISCO Corporation), while flowing water in large quantities so that an interval between grooves became 50 μm. Then, the halogenated polyamide acid composition prepared in Example 8 was applied dropwise thereto, and a film was formed by a spin coating method so that a film thickness after heat treatment became 15 μm, and the film was continuously heated for 4 hours in a baking furnace at 250° C., of which atmosphere was replaced with nitrogen gas, to give a upper clad layer. Further, the edge faces of an optical waveguide were cut using a dicing saw (trade name: "DAD 321", available from DISCO Corporation), while flowing water in large quantities, thereby forming a large diameter embedded type linear optical waveguide having a length of 50 mm, which had a 50-μm square core layer. In the large diameter embedded type linear optical waveguide obtained, the relative refractive index difference between the core layer and the lower and upper clad layers was 0.6% or greater at a wavelength of 1,550 nm, and the optical loss was measured to be 0.3 dB/cm at a wavelength of 850 nm.

In this Example, the halogenated polyimide films were not peeled at processing using a dicing saw, while flowing water in large quantities, and the edge faces of the optical waveguide were mirror planes.

The halogenated polyamide acid composition of the present invention provides a halogenated polyimide having a controlled refractive index only by treatment such as heat treatment or drying under reduced pressure. The halogenated polyimide obtained is particularly useful in fields related to optics, for example, as an optical film and as the core layer and the clad layer of an optical waveguide. Therefore, the halogenated polyamide acid composition of the present invention makes a great contribution to fields related to optics.

The invention claimed is:

1. A halogenated polyamide acid composition comprising a halogenated polyamide acid, a metal oxide precursor, at least one of trimethoxyborane and trimethyl phosphonate as a catalyst of reaction of generating a metal oxide from the precursor, and optionally a coupling agent having a reactive group.

2. The halogenated polyamide acid composition according to claim 1, wherein the halogenated polyamide acid is a partially halogenated polyamide acid obtained by reacting a fully halogenated acid dianhydride with a diamine.

3. The halogenated polyamide acid composition according to claim 1, wherein the halogenated polyamide acid is a fully halogenated polyamide acid obtained by reacting a fully halogenated acid dianhydride with a fully halogenated diamine.

4. The halogenated polyamide acid composition according to claim 1, wherein the coupling agent is a silane coupling agent.

5. A halogenated polyimide film obtained from a halogenated polyamide acid composition according to claim 1.

6. An optical waveguide comprising a core layer and a clad layer, both of which are made of halogenated polyimide films, wherein the halogenated polyimide film according to claim 5 forms at least one of the core layer and the clad layer, and wherein a relative refractive index difference between the core layer and the clad layer is 0.6% or greater.

7. An optical waveguide device comprising an optical waveguide according to claim 6.

8. A halogenated polyimide film having a refractive index at a wavelength of 1,550 nm of 1.520 or lower,
wherein the halogenated polyimide film is obtained from a halogenated polyamide acid composition comprising a partially halogenated polyamide acid, a metal oxide precursor, at least one of trimethoxyborane and trimethyl phosphonate as a catalyst of reaction of generating a metal oxide from the precursor, and optionally a coupling agent having a reactive group, and
wherein the partially halogenated polyamide acid is obtained by reacting a fully halogenated acid dianhydride with a diamine.

9. A halogenated polyimide film having a refractive index at a wavelength of 1,550 nm of 1.520 or lower,
wherein the halogenated polyimide film is obtained from a halogenated polyamide acid composition comprising a fully halogenated polyamide acid, a metal oxide precursor, at least one of trimethoxyborane and trimethyl phosphonate as a catalyst of reaction of generating a metal oxide from the precursor, and optionally a coupling agent having a reactive group, and
wherein the fully halogenated polyamide acid is obtained by reacting a fully halogenated acid dianhydride with a fully halogenated diamine.

10. An optical waveguide comprising a core layer and a clad layer, both of which are made of halogenated polyimide films, wherein the halogenated polyimide film according to claim 8 forms at least one of the core layer and the clad layer, and wherein a relative refractive index difference between the core layer and the clad layer is 0.6% or greater.

11. An optical waveguide comprising a core layer and a clad layer, both of which are made of halogenated polyimide films, wherein the halogenated polyimide film according to claim 9 forms at least one of the core layer and the clad layer, and wherein a relative refractive index difference between the core layer and the clad layer is 0.6% or greater.

12. An optical waveguide device comprising an optical waveguide according to claim 10.

13. An optical waveguide device comprising an optical waveguide according to claim 11.

* * * * *